United States Patent Office 3,840,634
Patented Oct. 8, 1974

3,840,634
VINYL HETEROCYCLIC COPOLYMERS, SEMI-PERMEABLE MEMBRANES FROM SAID COPOLYMERS AND METHOD FOR PREPARING SAID MEMBRANES
Antonio Chiolle, Ferrara, Lino Credali, Bologna, Paolo Longi and Francesco Greco, Milan, and Romano D'Angelo, Brugherio, Milan, Italy, assignors to Montecatini Edison S.p.A., Milan, and Consiglio Nazionale Delle Ricerche, Rome, Italy
No Drawing. Filed May 2, 1972, Ser. No. 249,734
Claims priority, application Italy, May 4, 1971, 24,058/71
Int. Cl. B29d 7/08; C08f 29/22
U.S. Cl. 264—216   7 Claims

ABSTRACT OF THE DISCLOSURE

Linear homogeneous copolymers of (1) a vinyl heterocyclic compound of the formula:

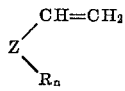

wherein Z is a pyridine, quinoline, or piperidine nucleus; R is alkyl having 1 to 10 carbon atoms; and $n$ is zero, 1 or 2, with (2) vinylidene chloride, alpha-chloro-acrylonitrile, or both.

These copolymers are self-crosslinking upon heating. The crosslinked product, wherein at least a portion of the nitrogen atoms are in the quaternary state, is suitable for use in semi-permeable membranes. Methods of preparing such membranes are disclosed.

BACKGROUND OF THE INVENTION

1. Field of the Invention

The present invention relates to vinyl heterocyclic copolymers, e.g., to vinyl pyridine copolymers, relates to selectively permeable membranes made from said copolymers, and relates to a process for the preparation of said membranes from said copolymers.

2. Description of the Prior Art

It is known that vinyl pyridine may be polymerized in the presence of free radical type initiators according to conventional polymerization techniques, such as, for instance, solution or emulsion polymerization.

Under such conditions, copolymers of vinyl pyridine with other vinyl monomers such as styrene, butadiene, acrylic esters, and the like also have been prepared.

Most of these vinyl pyridine polymers and copolymers, when the nitrogen atoms are quaternized, are either water soluble, or show a very high water absorption (especially when in a crosslinked form).

Vinyl pyridine is frequently used in the preparation of polymeric materials to be used for the preparation of selectively permeable membranes.

Many polymers and copolymers of vinyl pyridine have been suggested as starting material for the preparation of membranes that would be selectively permeable to certain anions. However, most of these membranes exhibit drawbacks of various kinds, depending on the type of polymeric material used.

Homopolymers of vinyl pyridine, when the pyridine nitrogen is quaternized, are soluble in water and, when subjected to crosslinking, show a very high degree of water absorption, generally greater than 50% by weight. This leads to an excessive swelling in water of membranes obtained therefrom.

From divinylbenzene - vinylpyridine copolymers, by means of a process that is characterized by a considerable number of technical difficulties, membranes may be obtained having a low selective permeability to anions. These membranes are characterized by a very high degree of water absorption, generally in excess of 50% by weight.

From rubbery butadiene-methylvinylpyridine copolymers, by means of a process which comprises heating the rubbery copolymer in a press in the presence of sulfur, carbon black, etc., at high temperatures for an appreciable time, non-homogeneous membranes are obtained. The non-homogeneity arises from the presence of materials having no ion-exchange capacity, which materials remain incorporated in the polymeric material during its transformation into membranes.

Membranes may also be prepared by grafting vinyl pyridines onto polymeric materials of various types and shapes, such as, synthetic and artificial films, optionally preliminarily activitated by irradiation with high-energy rays. Such membranes are generally characterized by a considerable swelling in water, a low exchange capacity, and electrical properties that are not entirely satisfactory. Moreover, frequently their preparation requires long and complex technologies. Finally, non-homogeneous membranes are obtained because of the presence of components that are chemically inert to ion exchange.

It is also known that homogeneous anionic membranes may be obtained from styrene-divinylbenzene copolymers which are chloromethylated and thereafter aminated. However, the method of preparation of such membranes is long, complex, and requires non-evaporative polymerization conditions.

SUMMARY OF THE INVENTION

The present invention provides vinyl heterocyclic copolymers, e.g., vinyl pyridine copolymers, that are essentially free from the foregoing drawbacks.

Membranes made from our copolymers are selectively permeable to anions.

Our invention further provides a process for the preparation of such membranes.

The copolymers of our invention are linear homogeneous copolymers of either vinylidene chloride or alpha-chloro-acrylonitrile, or both, with a vinyl heterocyclic compound of the formula (I):

 (I)

wherein Z represents a pyridine, quinoline or piperidine nucleus; R represents an alkyl group having from about 1 to 10 atoms; and $n$ is zero, 1 or 2.

Selectively permeable membranes are made from the foregoing copolymers, as described in the detailed description hereinafter.

DESCRIPTION OF THE PREFERRED EMBODIMENTS

Referring to the foregoing formula (I), examples of preferred vinyl heterocyclic compounds are 2-vinyl-pyridine, 4-vinyl-pyridine, 2-vinyl-5-methyl-pyridine, 2-ethyl-5-vinyl-pyridine, 2,4-dimethyl-6-vinyl-pyridine and the like.

Other vinyl heterocyclic compounds that may be employed include 2-vinylquinoline, 4-vinylquinoline, 2-vinyl-piperidine, 4-vinylpiperidine, vinyltoluidine, and the like.

The linear copolymers of this invention may be prepared by copolymerization of the monomers in the presence of free radical initiators following conventional well known techniques, e.g., mass, emulsion or suspension polymerization methods.

Preferably the copolymerization of vinyl pyridine with the other monomer (vinylidene chloride, alpha-chloroacrylonitrile, or both) is carried out at from about 0°–100° C., in solution, by employing as the solvent an alcohol, dimethylformamide, dimethylsulfoxide, pyridine, or the like.

The preferred range of molar ratios of vinyl pyridine to the other monomer (or mixture of monomers) is from about 0.2 to 1.5.

The molar content of the vinyl heterocyclic group in the resulting copolymer may vary over a wide range, generally from about 10 to 90 mole percent. The specific molar content will, of course, depend upon the particular end use contemplated for the copolymer.

We have found that our linear copolymers, upon heating, undergo crosslinking and are thus transformed into crosslinked, highly insoluble polymeric products that swell very little.

The linear copolymers of our invention are generally soluble in halogenated hydrocarbons, dimethylsulfoxide, dimethylformamide, hexamethylphosphoramide, and the like, but are generally insoluble in aliphatic hydrocarbons and ethers.

These copolymers are characterized by inherent viscosities (in dimethylformamide at 30° C.; concentration: 0.25 g./100 cc. of solvent) generally from about 0.05 to 4.5 dl./g.

From these copolymers, possibly in solution of suitable solvents, by means of conventional techniques of molding and extrusion, films, fibers and molded articles of virtually any size and shape may be obtained. A particularly advantageous utilization of these copolymers is as polymeric membranes that are selectively permeable to anions.

Thus, membranes that are selectively permeable to anions comprise the foregoing homogeneous copolymers, which have been self-crosslinked under heat, and wherein the nitrogen atoms present exist either totally or at least partially in the quaternary form. Desirably, although not essentially, the foregoing copolymer is in admixture with other polymeric materials containing residual double bonds and/or halogen atoms.

The membranes of our invention exhibit a complex of good characteristics, such as, moderate water adsorption, very good mechanical properties, high exchange capacity, low electrical resistance, and high selective permeability. They are insoluble in water and are characterized, as regards ion exchange, by a high degree of homogeneity, inasmuch as the ionically active groups constitute an integral part of a substituent group directly bound to the polymeric chains that form the membrane.

Thus, the membranes of our invention comprise homogeneous copolymers that are self-crosslinking under heat. The copolymer is of (1) vinylidene chloride or alpha-chloro-acrylonitrile (or both), with (2) the vinyl heterocyclic of formula (I), preferably a vinyl pyridine. As noted, the relative molar proportions may vary within wide ranges, depending on the chemical, physical, electrical and mechanical characteristics that are desired.

We have found that the exchange capacity of the membranes depends upon the content of vinyl heterocyclic, e.g., vinyl pyridine. Likewise, we have also found that it is possible to regulate the degree of self-crosslinking under heat (to thereby regulate the mechanical, physical and chemical characteristics of the membrane) by appropriate adjustment of the content of the other monomer, e.g., the vinylidene chloride content or the alpha-chloro-acrylonitrile content.

Copolymers that are particularly suited for membranes according to this invention comprise from about 10 to 60, and preferably from about 15 to 45 mole percent, of a vinylidene chloride and from about 40 to 90, and preferably from about 55 to 85 mole percent, of a vinyl pyridine.

As noted previously, preferred vinyl pyridine compounds include 2-vinyl pyridine, 4-vinyl pyridine, vinyltoluidine, and the like. Of course, if desired, one may substitute, in whole or in part, for the vinyl pyridine, vinylquinolines, vinylpiperidines, and the like.

Similarly, and as previously noted, one may substitute, in whole or in part, for the vinylidene chloride, alpha-chloroacrylonitrile.

Copolymers suitable for obtaining the membranes of this invention are prepared using conventional methods of polymerization of the mixture of monomers, e.g., in emulsion, suspension, in bulk, or in solution. The polymerization methods are very well known to those skilled in the art.

These linear copolymers, either alone or preferably in admixture with other polymeric materials containing double bonds and/or halogen atoms, when heated at temperatures greater than 80° C., undergo a considerable degree of self-crosslinking, resulting in the formation of materials that are endowed with a high mechanical resistance and a low rigidity, and that are completely insoluble in any organic or inorganic solvent and that are only slightly swellable, if at all, by such solvents.

The membranes are prepared from the above copolymers by means of a simple and economical process. The process comprises the following steps:

(a) dissolving the foregoing linear and homogeneous copolymer, either alone or preferably in admixture with other polymeric materials containing double bonds and/or halogen atoms, in a reasonably volatile organic solvent to thereby form a solution;

(b) casting the solution upon a plate, generally made of metal or glass, and then evaporating the solvent, as by heating to a temperature that ordinarily is below about 80° C., to thereby form the membrane;

(c) crosslinking the membrane by heating at temperatures of at least 80° C. As a result of such treatment, the membrane is subjected to crosslinking that contemporaneously involves the vinyl heterocyclic copolymer (homo-crosslinking) and, if present, the other polymeric material containing double bonds and/or halogen atoms (co-crosslinking);

(d) quaternizing at least 10 mole percent of the nitrogen atoms present, by treatment of the crosslinked membrane with mono- and/or poly-functional quaternizing agents.

The above method is extremely simple and can be readily and inexpensively carried out on a commercial scale, since (1) there is no need to operate under non-evaporative polymerization conditions and (2) the crosslinking of the polymeric materials that constitute the membrane occurs in a very short time.

The organic solvent to be used for the preparation of the copolymer solution in step (a) of the foregoing process is not critical and may be any of a wide number of compounds, provided it is reasonably volatile. Particularly desirable results are obtained by using polar organic compounds such as simple or substituted amides, sulfones, sulfoxides, alcohols and acids.

The quantity of copolymer present in the solution generally is from about 5% to 60% by weight with respect to the solution. Particularly satisfactory results are obtained when the quantity of copolymer is from about 10% to 25% by weight.

When operating in the presence of another polymeric material containing double bonds and/or halogen atoms, the solution may be prepared by making use of a solvent common to both polymeric materials. Alternatively, separate solutions of each of the polymeric materials in different solvents may be mixed together, taking care to avoid any precipitation of the polymeric materials when mixing together the two solutions.

The polymeric material containing double bonds and/or halogen atoms may be any of a wide number of synthetic or natural polymers and/or copolymers. Good results are obtained using the following polymeric materials: synthetic or natural unsaturated rubbers (e.g., styrene rubbers, nitrile rubbers, acrylic rubbers, polybutadiene and polyisoprene rubbers, ethylene- and propylene-based unsaturated rubbers, and the like), vinyl chloride and vinylidene chloride polymers and/or copolymers, products obtained from partial or total halogenation of synthetic and natural rubbers or of olefin polymers and copolymers (e.g., halogenated polybutadienes, chlorinated polyethylene, chlorinated ethylene-propylene copolymers). A preferred polymeric material is polyvinyl chloride.

The foregoing polymeric material (or materials) is used in admixture with the vinyl heterocyclic copolymer in a weight ratio range of from about 0.1 to 10.

The temperature at which one operates during the preparation of the solution must be lower than the temperature at which the self-crosslinking of the vinyl heterocyclic copolymer commences. Thus, in general it is preferable to operate at temperatures around room temperature and in any event below 80° C.

The formation of a membrane from the solution is carried out in step (b) of the process, as by first spreading the solution upon a glass or metal plate or on any other suitable flat, smooth surface, and then evaporating the solvent under controlled conditions.

The temperature, even if below that at which the self-crosslinking of the vinyl heterocyclic copolymer commences, must be sufficiently high to result in removal of the solvent within a relatively short period of time. For these reasons, it is preferred to operate at temperatures comprised of from about 30° C. to 70° C. and, in any event, less than 80° C.

The time for evaporating the solvent will of course depend upon the thickness of the membrane to be prepared and on the temperature at which one operates. Usually, the evaporation time will vary from about 1 to 40 minutes.

The solvent evaporation is generally carried out by placing the plate (on which there had been spread the copolymer solution), into an oven or furnace.

The crosslinking of the membrane is carried out in step (c) of the foregoing process by heating the membrane at a temperature of from about 80° C. to 180° C., with the heating time ordinarily being from about 10 to 200 minutes.

Usually, the plate on which, after evaporation of the solvent, there had formed a membrane, is simply placed into an oven or furnace, at a temperature and for a heating time corresponding to those above indicated.

In order to facilitate removal of the membrane from the plate, the plate desirably is treated, after crosslinking of the membrane with a material such as a lower aliphatic alcohol. This treatment is carried out at temperatures generally of from about −10° C. to +70° C.

The quaternization of nitrogen atoms from the vinyl heterocyclic compound occurs in step (d) of the process, by treating the crosslinked membranes with quaternizing mono-and/or poly-functional agents that may be selected from a wide range of compounds of the type well known to those skilled in the art. Of course, any such compound must be sufficiently reactive to form stable quaternary nitrogen atoms, when reacted with the ternary nitrogen atoms of the vinyl heterocyclic compound.

Examples of mono-functional quaternizing agents that may be conveniently used include: alkyl- and aryl-monohalides and alkyl- and aryl-sulfates such as methyl-, ethyl-, propyl-, n-butyl-, cyclohexyl-, dodecyl-, hexadecyl-, and benzylchloride, bromide, and iodide; long-chain alkyl-benzene chlorides, bromides and iodides; methyl- and ethyl-sulfates; and the like.

Examples of poly-functional quaternizing agents that may be conveniently used include: aliphatic, aromatic and alkylaromatic dihalogen derivatives such as 1,2-dichloroethane, 1,2-dibromoethane, 1,2-diiodoethane, 1,2- and 1,3-dichloropropane, 1,2- and 1,3-dibromopropane, 1,2- and 1,3-diiodopropane, 1,3- and 1,4-dichlorobutane, 1,3- and 1,4-dibromobutane, 1,3- and 1,4-diiodobutane, bis(chloromethyl) 1,2 - benzene, bis(chloromethyl) 1,4-benzene, bis(bromomethyl) 1,2- and 1,4-benzenes, and other analogous compounds.

One or more mono- or poly-functional quaternizing agents or mixtures of one or more mono-functional quaternizing agents with one or more poly-functional quaternizing agents may of course be used.

When using poly-functional quaternizing agents, besides quaternizing of nitrogen atoms of the vinyl heterocyclic, there also occurs a further crosslinking of the membrane.

According to a preferred embodiment, the membrane is first treated with a poly-functional quaternizing agent and subsequently with a mono-functional quaternizing agent.

The quaternization may involve all the nitrogen atoms present from the vinyl heterocyclic or at least 10 mole percent of them. In the first case, a membrane formed of strongly basic exchangers (100% of quaternary nitrogen atoms) is obtained. In the latter case, a membrane made up of both weakly basic exchangers as well as strongly basic exchangers (mixture of tertiary and quaternary nitrogen atoms) is obtained.

The quaternization is preferably carried out by treating the membrane with a solution of the quaternizing agent, i.e., wherein the quaternizing agent is dissolved in a solvent that is capable of diffusing through the membrane. Such a solvent may be selected from a wide range of compounds. Particularly advantageous results are obtained when using organic solvents such as methanol, isopropanol, benzene, toluene, chloroform acetone, tetrahydrofurane, and the like.

The quaternizing reaction is carried out at a temperature of from about 20° C. to 110° C.

The duration of this reaction will depend on the temperature at which one operates and on the type of quaternizing agent used. Generally it will be from about 10 minutes to 5 hours.

A preferred mode of operation is to perform the quaternization in two successive steps at two different temperatures. More particularly, the first step is carried out at about room temperature, while the second step is carried out at a temperature greater than room temperature, generally between about 60° C. and 110° C.

In the first step there occurs diffusion of the quaternizing agent inside the swollen membrane and a partial quaternization of nitrogen atoms from the vinyl heterocyclic. This is completed within a relatively short time in the second step at a higher temperature.

The membranes, after the quaternization treatment, are generally maintained in water or balanced in aqueous solutions of NaCl. These membranes, however, may be preserved in the dry state without suffering any permanent deformation or rupture, and will maintain their initial electrical and mechanical properties.

With the process of this invention it is possible to advantageously prepare membranes that are selectively permeable to anions having at least two dimensions greater than 1 cm. In such membranes, the nitrogen atoms from the vinyl heterocyclic are partially or totally quaternized and are present in polymeric chains arranged according to a three-dimensional crosslinked structure.

These membranes are in no way damaged or rendered brittle because of the crosslinking and quaternizing treatments.

The membranes of this invention may be prepared over a wide range of thickness, in general than 20μ. They may be advantageously used in multi-chamber cells for electrodialysis and, in more reduced size, in standard ion-exchange apparatuses.

The membranes are solid, homogeneous and, of particular advantage, show the proper degree of water absorption (generally around 30%).

The mechanical properties of the membranes are very good and may be further improved by using reinforcing materials or by making use of a suitable support.

For this purpose natural, artificial or synthetic fibers may be used. The membranes of this invention show excellent properties of adhesion to and compatibility with such fibers.

Particularly advantageous results are obtained by using fabrics made of glass fibers, polyester fibers, polyamide fibers, polyolefin fibers, fibers of vinyl polymers, and the like.

The membranes according to this invention are characterized by a low electrical resistance and by a high-exchange capacity which may be varied within a wide range, by suitably regulating the concentration of the fixed ionic charges.

The ion-exchange capacity of the membranes of this invention is, in general, greater than 0.3 milliequivalents per gram of dry product.

The membranes of the invention, quaternized in the chlorine form, have an electrical conductivity generally greater than $1 \times 10^{-4}$ ohm$^{-1}$ cm.$^{-1}$. These membranes display a high selective permeability to anions, as is evidenced by the high potential developed by these membranes when these latter are placed in standard cells of the type:

Calomel electrode
Saturated KCl saline bridge
KCl 0.2 molal solution
Membrane according to this invention in the Cl$^-$ form
KCl 0.1 molal solution
Saturated KCl saline bridge
Calomel electrode.

In fact, at 25° C. it is possible to measure a potential of concentration very close to the ideal thermodynamic value of 16.08 mv. In other words, the membranes according to this invention are characterized by transport numbers very near the unit.

The membranes of this invention may be used in all those processes in which ion exchange occurs, such as: demineralization of water, concentration of radioactive materials or of light metals, purification of proteins, purification of sugar solutions, and in demineralization processes. More particularly, the membranes of this invention may be advantageously used for demineralization of sea water and brackish water.

The following examples will further illustrate the invention. All parts are by weight unless otherwise stated.

EXAMPLE 1

(A) Preparation of vinyl pyridine copolymer 103 g. of 4-vinyl pyridine, 170 cc. of dimethylsulfoxide, 79 g. of vinylidene chloride and 2 g. of $(NH_4)_2S_2O_8$ were introduced, under a nitrogen atmosphere, into a three-necked 500 cc. flask, fitted with a stirrer. This mixture was stirred for 15–20 minutes at room temperature, then all inlets to the flask were closed and the whole was heated for 16 hours under stirring at 50° C. At the end the resulting mass was poured into about 1000 cc. of benzene and the polymer thus precipitated was separated, dissolved in hot chloroform, and then was again precipitated by means of heptane.

A granular mass was thereby obtained, having a bright yellow color. The yield, after drying under reduced pressure, was 100 grams.

Elementary analysis gave the following data: Cl percent=13.30, N percent=10.90, corresponding to a molar composition of 18.5% of vinylidene chloride and 81.85% of 4-vinyl pyridine. The inherent viscosity, determined in dimethlyformamide at 30° C., was 0.17 dl./g.

This copolymer was soluble in dimethylformamide, dimethylsulfoxide, alcohols, organic and inorganic acids also diluted and halogenated solvents such as chloroform and methylene chloride. It was swellable in water and in ketones. It was insoluble in ethers, and aliphatic and aromatic hydrocarbons.

By evaporation at 110° C.–120° C. of a solution of the copolymer in dimethylformamide, a film was obtained. It was insoluble and virtually non-swellable in dilute hydrochloric acid or in dimethylformamide.

Finally, by evaporation at 110°–120° C. of a solution of a mixture of the copolymer and polyvinyl chloride (in a ratio by weight of 1:1), in dimethylformamide, a very flexible film was obtained that was virtually non-swellable in dilute hydrochloric acid or in dimethylformamide.

(B) Preparation of the membrane 10 g. of the above copolymer, in admixture with 10 g. of polyvinyl chloride having an inherent viscosity in cyclohexanone at 30° C. (solution of 0.25 g. of the polymer in 100 cc. of the solvent) equal to 1.5 dl./g., were dissolved at 40° C. in 120 cc. of dimethylformamide. The resulting solution was then spread with a film spreader onto a flat glass plate and placed into an oven at 80° C. After 30 minutes the temperature of the oven was gradually raised (over a period of about 20 minutes) to 120° C. and then maintained at this temperature for about one hour.

The resulting film could be easily removed from the plate on which it was formed by dipping the plate into methanol.

(C) Characterization of the membrane

A membrane, prepared according to the procedures described in Example 1B, was subjected to a quaternization treatment by dipping, at room temperature into a methanol solution containing an excess of methyl iodide. After about four hours of such treatment, the temperature was brought up to 60° C. and maintained at this temperature for two hours. The quaternized membrane was then removed from the solution and washed in ethanol.

The membrane thus obtained was transformed into the chlorine form by treating for 48 hours with a 1 N solution of NaCl. The resulting membrane had the characteristics set out in Table I.

TABLE I

| Properties | Procedure | Value |
|---|---|---|
| Electrical resistance | (1) | 2.1 ohm cm.³. |
| Transfer number $t$ Cl$^-$ | (2) | 0.96. |
| Exchange capacity | (3) | 2.8 meq./g. |
| Water absorption | (4) | 40 percent. |

¹ In a 0.5 N NaCl aqueous solution at 25° C. to 1° C., in accordance with the process described in "Test Manual For Permoselective Membranes"—Method 601-1, page 156—O.S.W. Report No. 77 (January 1964).
² In a 0.5/0.25 N NaCl aqueous solution, in accordance with the process described in "Test Manual for Permoselective Membranes"—Method 602-1, page 163—O.S.W. Report No. 77.
³ Procedure described in "Test Manual for Permoselective Membranes"—Method 502-1, page 132—O.S.W. Report No. 77.
⁴ Procedure described in "Test Manual for Permoselective Membranes"—Method 412-1, page 120—O.S.W. Report No. 77.

EXAMPLE 2

A membrane, prepared according to the procedure described in Example 1B, was subjected to a quaternizing treatment by dipping at room temperature into an alcoholic solution containing a stoichiometric quantity, with respect to the pyridine nitrogen atoms, of diiodoethane. After a short time, the temperature was brought up to 80° C. and maintained there for about two hours. The membrane was then removed from the solution and washed in fresh ethanol.

The membrane, transformed into the chlorine form by treating it for 48 hours with a 1 N solution of NaCl, had the characteristics reported in Table II.

TABLE II

| Properties | Procedure | Value |
|---|---|---|
| Electrical resistance | (1) | 5 ohm cm.² |
| Transfer number t Cl⁻ | (2) | 0.96 |
| Exchange capacity | (3) | 2.6 meq./g. |
| Water absorption | (4) | 31 percent. |

See footnotes at end of Table I.

EXAMPLE 3

A membrane, prepared according to the procedure described in Example 1B, was subjected to a quaternization treatment by dipping at room temperature into an alcoholic solution containing the stoichiometric quantity, with respect to the pyridine nitrogen atoms, of diiodoethane and methyl iodide in a ratio in equivalents of 3:1. The temperature was then brought up to 80° C. and maintained there for about two hours.

After washing in methanol, the membrane, transformed into the chlorine form by treating it for 48 hours with a 1 N solution of NaCl, had the characteristics set out in Table III.

TABLE III

| Properties | Procedure | Value |
|---|---|---|
| Electrical resistance | (1) | 3.2 ohm cm.² |
| Transfer number t Cl⁻ | (2) | 0.98 |
| Exchange capacity | (3) | 2.8 meq./g. |
| Water absorption | (4) | 30 percent. |

See footnotes at end of Table I.

EXAMPLE 4

Example 1A was repeated, but starting with 10 g. of 4-vinyl pyridine, 20 g. of vinylidene chloride, 20 cc. of dimethylsulfoxide, and 0.3 g. of $(NH_4)_2S_2O_8$.

After 17 hours of polymerization at 50° C., 11.5 g. of copolymer were obtained which, upon analysis, showed the following molar composition.

|  | Mole percent |
|---|---|
| 4-vinyl pyridine | 62.8 |
| Vinylidene chloride | 37.2 |

This copolymer exhibited essentially the same characteristics as those of Example 1A.

After crosslinking and quaternizing the copolymer in admixture with polyvinyl chloride (ratio by weight 1:1), membranes were obtained having essentially the same characteristics as those described in Examples 1 to 3.

EXAMPLE 5

Example 1A was repeated, but starting with 7 g. of 2-vinyl pyridine, 20 g. of vinylidene chloride, 40 cc. of toluene, and 0.5 g. of alpha-alpha-azobisisobutyronitrile. After two hours of polymerization at 70° C., the polymerization product was poured into 200 cc. of n-heptane.

4 g. of copolymer were thereby obtained, which upon analysis, showed the following molar composition:

|  | Mole percent |
|---|---|
| 2-vinyl pyridine | 57.3 |
| Vinylidene chloride | 42.7 |

This copolymer had characteristics substantially similar to those of the copolymer of Example 1A.

After crosslinking and quaternizing the copolymer in admixture with polyvinyl chloride (ratio by weight 1:1), membranes were obtained having essentially the same characteristics as those described in Examples 1 to 3.

EXAMPLE 6

Example 1A was repeated, but starting with 10.5 g. of 4-vinyl pyridine, 8.8 g. of alpha-chloro-acrylonitrile, 20 cc. of dimethylsulfoxide, 0.3 g. of $(NH_4)_2S_2O_8$ and 0.05 g. of $NaHSO_3$.

After 17 hours of polymerization at room temperature the resulting polymerization product was poured into 200 cc. of benzene. The solid obtained, after decanting the overlying liquid, was again dissolved in dimethylformamide and finally precipitated in acetone. 9 g. of a powdery copolymer were thereby obtained. The copolymer had an inherent viscosity (in dimethylformamide at 30° C.) equal to 0.1 dl./g.

Elementary analysis carried out on a sample of the copolymer yielded the following results:

|  | Percent by weight |
|---|---|
| Nitrogen | 15.50 |
| Chlorine | 17.70 | which corresponds to the following molar composition:

|  | Mole percent |
|---|---|
| 4-vinyl pyridine | 51.9 |
| Alpha-chloro-acrylonitrile | 48.1 |

This copolymer was soluble in dimethylformamide, dimethylsulfoxide, and organic and inorganic acids also diluted. It was insoluble in acetone, chloroform and in ethers.

After crosslinking and quaternizing the copolymer mixture with polyvinyl chloride (ratio by weight 1:1), membranes were obtained which exhibited essentially the same characteristics as described in Examples 1 to 4.

Various membranes may be prepared according to the process of the foregoing examples from copolymers of various compositions and using vinylidene chloride, alpha-chloro-acrylonitrile, and pyridine monomers, and such membranes will possess mechanical and electrical characteristics equal to those of the membranes described in Examples 1 to 4.

Variations can, of course, be made without departing from the spirit and scope of the invention.

Having thus described the invention, what is desired to be secured by Letters Patent and hereby claimed is:

1. A method for preparing a membrane that is selectively permeable to anions, this method comprising:
   (a) casting onto a support surface, an organic solvent solution of a mixture of (1) a linear, homogeneous copolymer of vinylidene chloride and a vinyl heterocyclic compound of the general formula

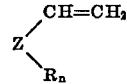

wherein Z represents a pyridine, quinoline or piperidine nucleus; R represents an alkyl group having from 1 to 10 carbon atoms; and $n$ is 0, 1 or 2 and (2) a polymeric material selected from the group consisting of vinyl chloride polymers and vinylidene chloride polymers;

(b) evaporating the solvent at a temperature below 80° C. to thereby form a membrane;
   (c) effecting crosslinking of the membrane by heating at a temperature above 80° C.; and
   (d) quaternizing at least a portion of the nitrogen atoms by treating the crosslinked membrane with a quaternizing agent.

2. The method of claim 1, wherein the units derived from the vinyl heterocyclic compound are present in an amount of from 10 to 90 mole percent.

3. The method of claim 1, wherein said copolymer has an inherent viscosity, as determined in dimethylformamide at 30° C. at a concentration of 0.25 g./100 cc. of solvent, between 0.05 and 4 dl./g.

4. The method of claim 1, wherein said heating step (c) is carried out at a temperature of from about 90° C. to 180° C. and wherein said quaternizing agent in step (d) is a mono-functional or poly-functional quaternizing agent or a mixture thereof.

5. The method of claim 1, wherein the weight ratio of said polymeric material to said linear homogeneous copolymer is between 0.1 and 10.

6. The product is the method of claim 1.

7. The method of claim 3, wherein the copolymer in step (a) contains, in chemically combined form, from 15 to 45 mole percent of said vinylidene chloride and from 55 to 85 mole percent of said vinyl heterocyclic compound.

References Cited

UNITED STATES PATENTS

| | | | |
|---|---|---|---|
| 3,650,818 | 3/1972 | Marzocchi | 260—895 |
| 2,613,195 | 10/1952 | Craig | 260—895 |
| 2,752,318 | 6/1956 | De Witt | 260—895 |
| 2,686,169 | 8/1954 | Ham | 260—895 |
| 2,827,443 | 3/1958 | Rector et al. | 260—87.7 |
| 2,612,446 | 9/1952 | Umberger | 260—895 |

FOREIGN PATENTS

| | | | |
|---|---|---|---|
| 763,293 | 12/1956 | Great Britain | 260—895 |

WILBERT J. BRIGGS, Sr., Primary Examiner

U.S. Cl. X.R.

210—37, 500; 260—2.1 E, 4 R, 80.72, 87.7, 890, 895, 898, 899